United States Patent
Truong et al.

(10) Patent No.: US 9,464,752 B2
(45) Date of Patent: Oct. 11, 2016

(54) MONITOR STAND ASSEMBLY

(75) Inventors: Cuong Huy Truong, Cary, NC (US); Timothy Samuel Farrow, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 964 days.

(21) Appl. No.: 13/160,676

(22) Filed: Jun. 15, 2011

(65) Prior Publication Data

US 2012/0320513 A1    Dec. 20, 2012

(51) Int. Cl.
*F16M 11/10* (2006.01)
*F16M 11/20* (2006.01)

(52) U.S. Cl.
CPC .......... *F16M 11/10* (2013.01); *F16M 11/2021* (2013.01); *F16M 2200/041* (2013.01); *F16M 2200/044* (2013.01)

(58) Field of Classification Search
CPC .. F16M 11/10; F16M 11/2021; F16M 11/04; F16M 11/06; F16M 11/105; F16M 11/12; F16M 11/2064; F16M 220/044; F16F 9/0209; G06F 1/16; G06F 1/1601; G06F 1/1622; G06F 1/1613; G06F 1/1633; G06F 1/1637; H05K 7/16
USPC ............ 361/679.01–679.07, 679.21, 679.22, 361/679.27; 248/372, 176.1, 162.1, 123.11, 248/374, 284.1, 917, 274.1, 279.1
See application file for complete search history.

(56) References Cited

U.S. PATENT DOCUMENTS

| | | | | |
|---|---|---|---|---|
| 5,799,917 A * | 9/1998 | Li | ............................ | 248/284.1 |
| 5,924,665 A * | 7/1999 | Sweere et al. | ............. | 248/285.1 |
| 6,015,120 A * | 1/2000 | Sweere et al. | ........... | 248/123.11 |
| 6,288,891 B1 * | 9/2001 | Hasegawa et al. | ...... | 361/679.07 |
| 6,442,451 B1 | 8/2002 | Lapham | | |
| 6,657,853 B2 * | 12/2003 | Oba | ........................ | F16M 11/10 206/320 |
| 7,198,237 B2 * | 4/2007 | Cho et al. | ...................... | 248/133 |
| 7,793,897 B2 * | 9/2010 | Wang et al. | ............... | 248/125.2 |
| 8,226,054 B2 * | 7/2012 | Chen et al. | .................... | 248/127 |
| 9,103,490 B2 * | 8/2015 | Atallah | .................. | F16M 11/04 |
| 2005/0105257 A1 * | 5/2005 | Shimizu et al. | ............. | 361/681 |
| 2005/0168925 A1 * | 8/2005 | Fang et al. | .................... | 361/683 |
| 2005/0224664 A1 * | 10/2005 | Metelski | .................. | 248/123.11 |

(Continued)

FOREIGN PATENT DOCUMENTS

CN          1483807          3/2004

OTHER PUBLICATIONS

IIT Industrial Gas Springs & Dampers, 2008 (20 pages).

(Continued)

*Primary Examiner* — Hoa C Nguyen
*Assistant Examiner* — Christopher L Augustin
(74) *Attorney, Agent, or Firm* — Brian J. Pangrle

(57) ABSTRACT

A monitor stand assembly includes a base, an arm that includes a monitor joint configured for pivotable attachment to a monitor and a base joint configured for pivotable attachment to the base, and an adjustable force strut. Such a strut may include a strut housing, a strut rod, an adjustment mechanism for adjusting force exerted by the rod with respect to the housing, an arm joint configured for pivotable attachment to the arm and a base joint configured for pivotable attachment to the base. Such an assembly may be suited to accommodate monitors of various weights and provide for flexible ergonomics. Various other apparatuses, systems, methods, etc., are also disclosed.

7 Claims, 8 Drawing Sheets

(56) References Cited

U.S. PATENT DOCUMENTS

| | | | |
|---|---|---|---|
| 2005/0254204 A1* | 11/2005 | Hwang et al. | 361/681 |
| 2006/0054751 A1* | 3/2006 | Johnson et al. | 248/123.11 |
| 2006/0266903 A1* | 11/2006 | Oddsen et al. | 248/274.1 |
| 2007/0058329 A1* | 3/2007 | Ledbetter et al. | 361/681 |
| 2007/0095993 A1* | 5/2007 | Yamamoto | 248/284.1 |
| 2008/0149794 A1* | 6/2008 | Yamamoto et al. | 248/274.1 |
| 2011/0315843 A1* | 12/2011 | Hung | 248/279.1 |
| 2012/0293936 A1* | 11/2012 | Wu et al. | 361/679.4 |

OTHER PUBLICATIONS

Ameritool, 875, 1165 Series Nitrogen Bleed Off Instructions, 2005 (1 page).

Guden, Gas Springs and Dampers Frequently Asked Questions, (https://www.guden.coml as in 2011) (6 pages).

* cited by examiner

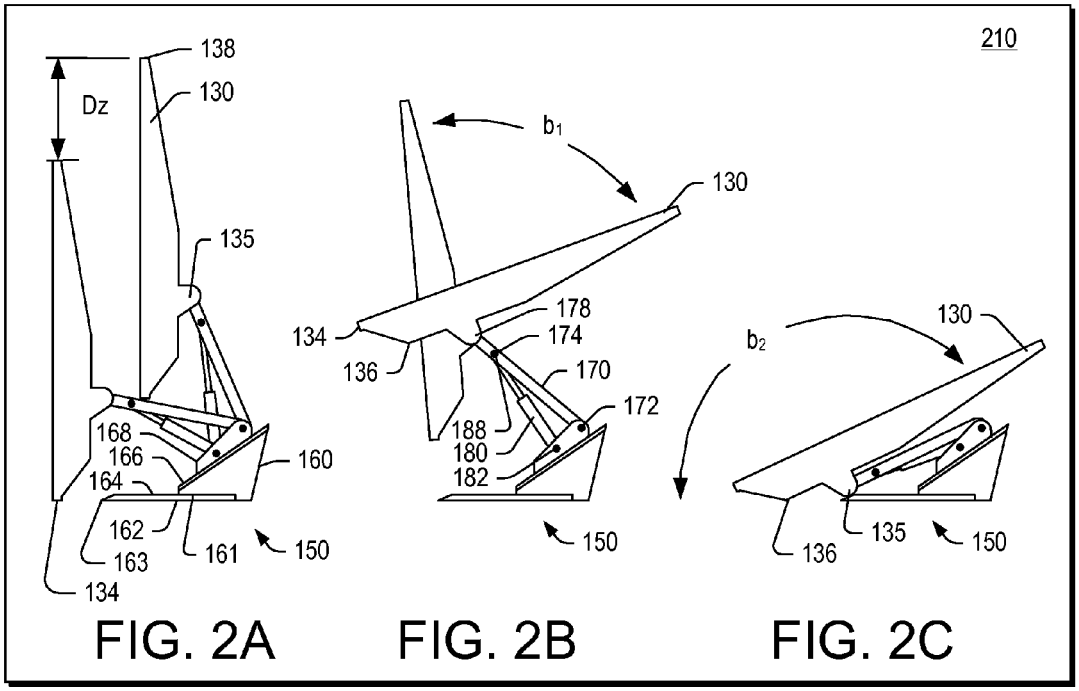
FIG. 2A  FIG. 2B  FIG. 2C
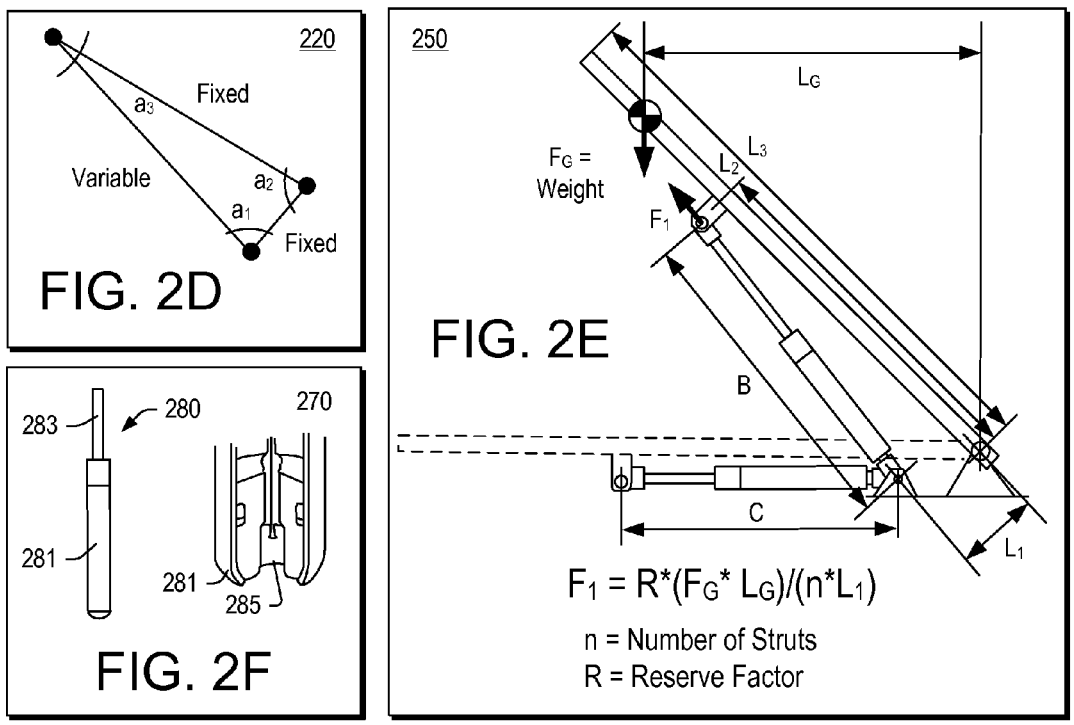
FIG. 2D
FIG. 2F
FIG. 2E
$$F_1 = R*(F_G * L_G)/(n*L_1)$$
n = Number of Struts
R = Reserve Factor

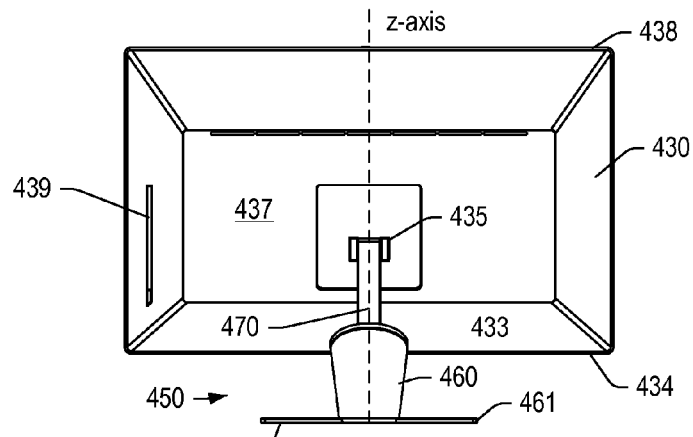
FIG. 4A
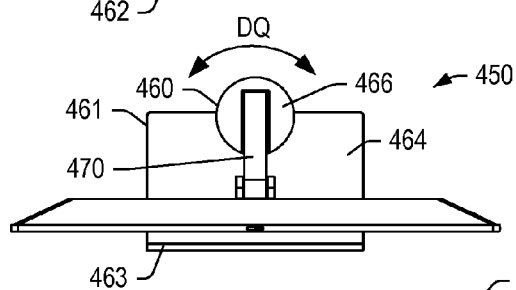
FIG. 4B
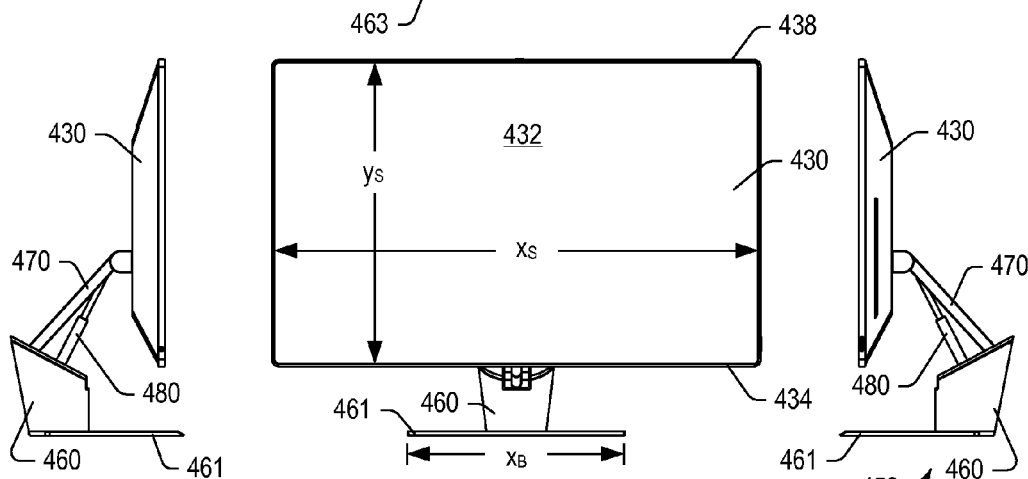
FIG. 4D
FIG. 4C
FIG. 4E
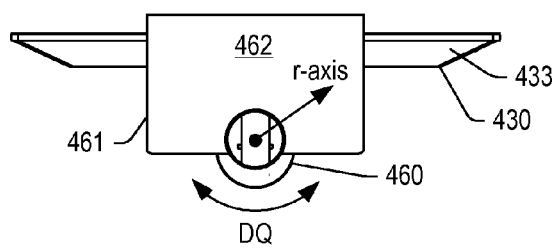
FIG. 4F

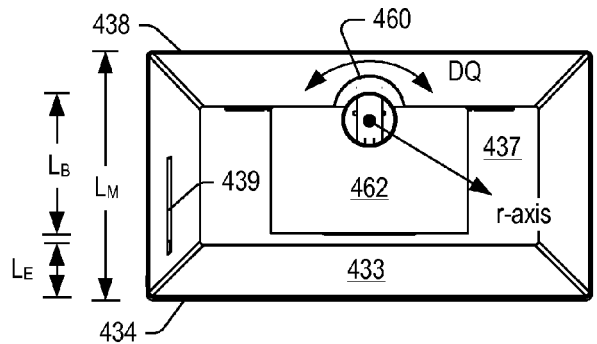
FIG. 5A
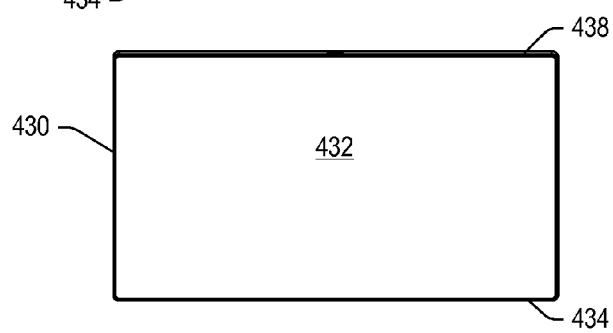
FIG. 5B
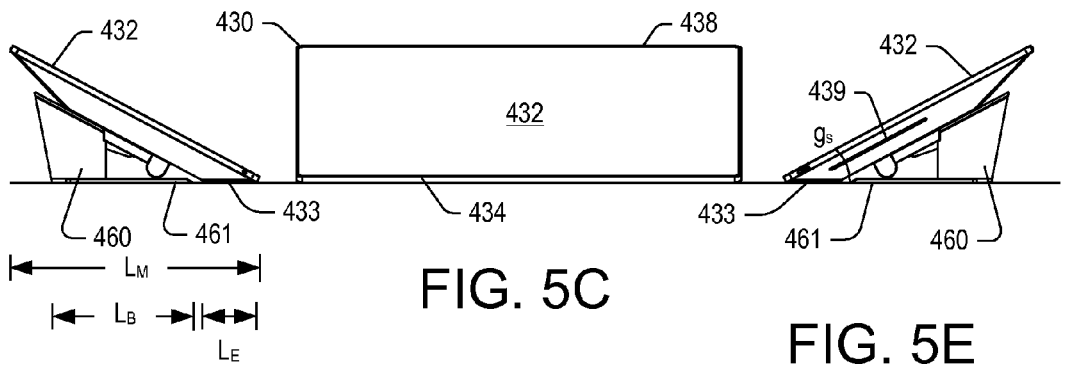
FIG. 5C
FIG. 5D
FIG. 5E
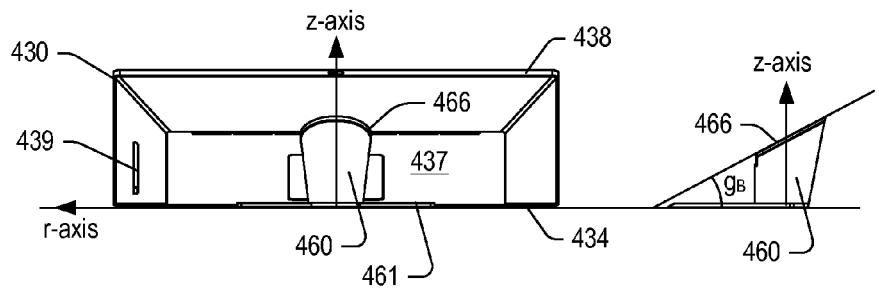
FIG. 5F
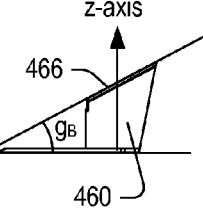
FIG. 5G

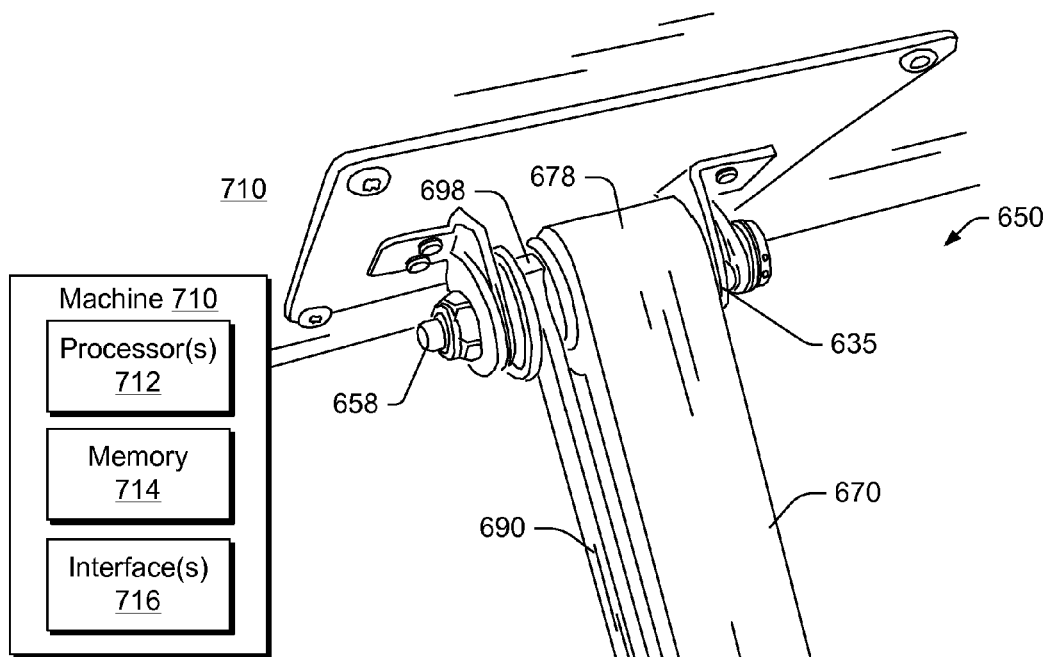
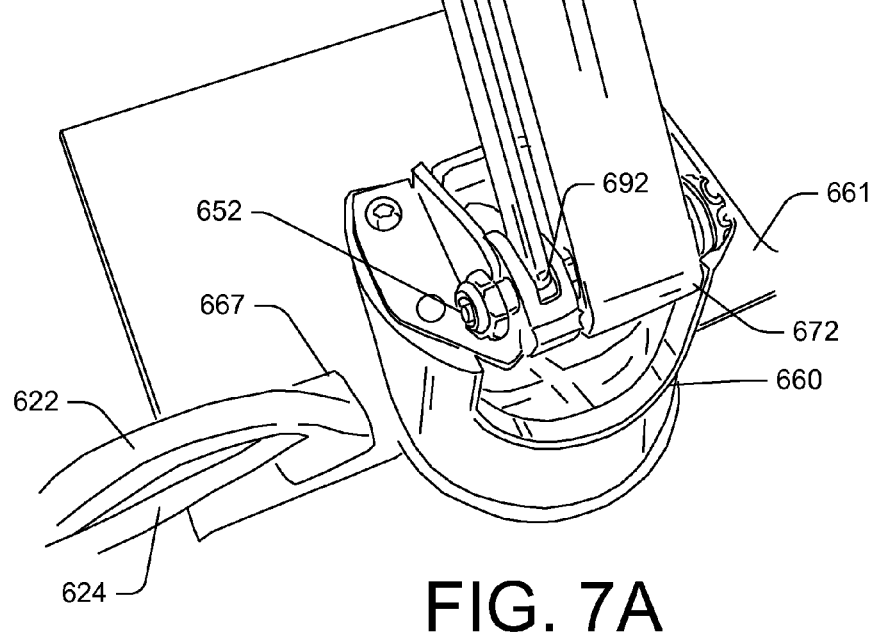
FIG. 7B
FIG. 7A

MONITOR STAND ASSEMBLY

TECHNICAL FIELD

Subject matter disclosed herein generally relates to stand assemblies for monitors.

BACKGROUND

As visual interfaces continually evolve for display of information, touch input, etc., users are demanding more flexible ergonomic systems to support such interfaces. For example, consider a monitor that can display information as well as optionally operate as a touch screen keyboard, drafting table, etc. At times, a user may desire an ergonomic configuration better suited to visualization of information while, at other times, a user may desire an ergonomic configuration better suited to touch input. As described herein, various stand assemblies can provide for flexible ergonomics.

SUMMARY

A monitor stand assembly includes a base, an arm that includes a monitor joint configured for pivotable attachment to a monitor and a base joint configured for pivotable attachment to the base, and an adjustable force strut. Such a strut may include a strut housing, a strut rod, an adjustment mechanism for adjusting force exerted by the rod with respect to the housing, an arm joint configured for pivotable attachment to the arm and a base joint configured for pivotable attachment to the base. Such an assembly may be suited to accommodate monitors of various weights and provide for flexible ergonomics. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIGS. 2A, 2B and 2C are diagrams of an example of a monitor stand assembly, FIGS. 2D and 2E are diagrams for calculation of force for a strut and FIG. 2F is a diagram of an example of an adjustment mechanism to adjust force of a strut;

FIGS. 4A, 4B, 4C, 4D, 4E and 4F are a series of views of an example of a monitor stand assembly fitted to a monitor;

FIGS. 5 A, 5B, 5C, 5D, 5E, 5F and 5G are a series of views of the monitor stand assembly of FIGS. 4A to 4F fitted to a monitor;

FIG. 7A is another perspective view of the monitor stand assembly of FIG. 6A; and FIG. 7B is a block diagram of an example of a machine, optionally mounted to the monitor stand assembly or in communication with a monitor mounted to the monitor stand assembly.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1A:
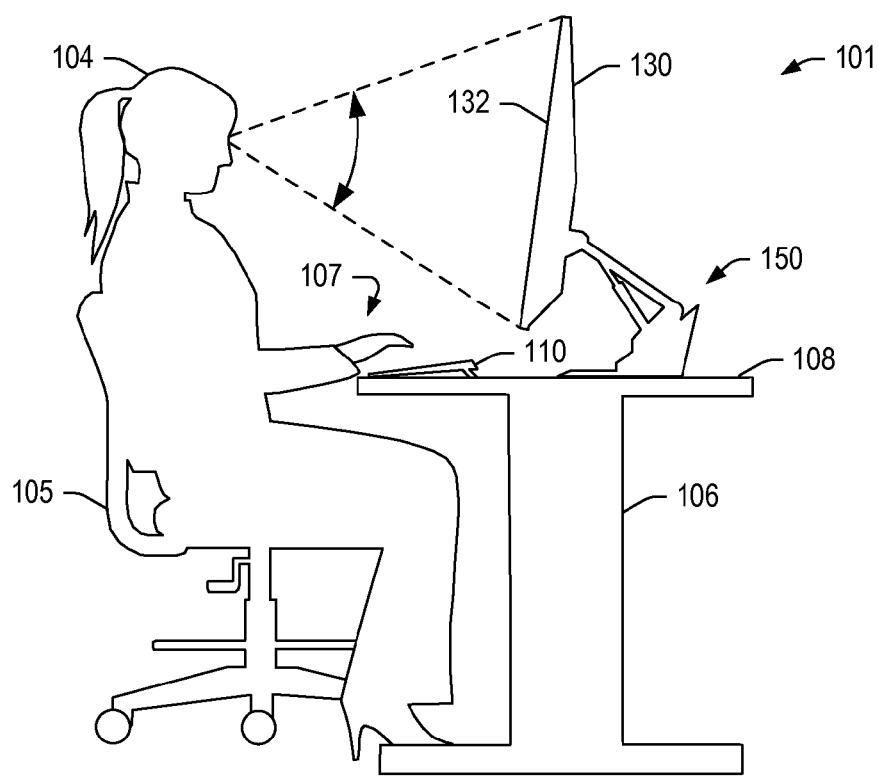
FIGS. 1A and 1B are diagrams of two scenarios for usage of a monitor.
Figure 1B:
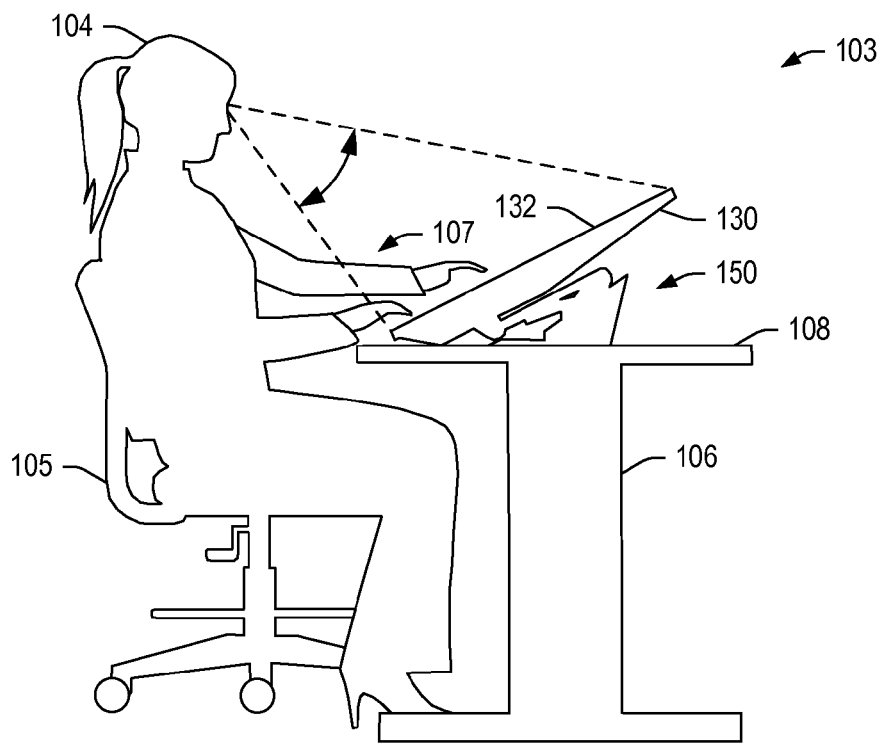

FIG. 1 shows scenarios 101 and 103 where, for example, a user 104 is seated in a chair 105 before a table 106 with a surface 108 that supports equipment. For the scenario 101, which may be referred to as a vertical mode orientation, the equipment includes a keyboard 110, a monitor 130 and a monitor stand assembly 150. As shown, the user 104 uses her hands 107 to enter keystrokes via the keyboard 110. The user 104 can visualize information via the monitor 130, which has a screen 132. The user 104 may have an angle of view (or view angle) for comfortably viewing the screen 132. In general, the user 104 may adjust the chair 105, the table 106 or even her posture and head angle to achieve an ergonomically suitable environment. Such adjustments may be somewhat time consuming, requiring a user to get up from her seat, look underneath her seat for an adjustment mechanism or mechanisms, look underneath the table for an adjustment mechanism or mechanisms or look for a crank for insertion into one or more crank fittings to crank a mechanism to adjust a surface of the table. Unfortunately, users often forego proper ergonomics because such adjustments are time consuming, complicated and require iterative trial-and-error, sometimes over a process of days or weeks.

As described herein, the monitor stand assembly 150 allows for various adjustments to enhance ergonomics of a user's environment, which may be dynamic (e.g., depending on user comfort, tasks, etc.). As described herein, the monitor stand assembly 150 can optionally allow for a wide range of adjustments. Such adjustments may be achieved quickly and easily via a user's hand or hands, even while the user may remain seated. For example, the user 104 in scenario 101 may set the keyboard 110 aside, grab the monitor 130 with both hands and tilt it downward to a touch mode orientation, per scenario 103. As necessary, the user 104 may slide the monitor 130 as mounted to the monitor stand assembly 150 forward to readily allow for touching with her hands 107 part of the screen 132 or the entire screen 132. As shown, the user 104 may achieve a suitable ergonomic environment without adjustment to the chair 105 or the table 106. In the example of FIG. 1, the user 104 may merely adjust gaze, head angle or a combination of both when transitioning from the scenario 101 to the scenario 103.

As described herein, a monitor may be part of a computing device (e.g., a tablet, touch monitor computing device, monitor computing device, etc.) or may be a separate device connected to a computing device via a wired connection, a wireless connection or a combination of wired and wireless connections. As described herein, a monitor may be connected to a network for display of information received via the network and optionally as an input device to transmit information via the network.

As described herein, a monitor stand assembly can include an adjustable force strut. As different monitors can vary in mass, an adjustable force strut can accommodate different masses and thereby allow for use of a monitor stand assembly with different monitors. For example, a method can include providing a mass for a monitor, providing a stand that includes an adjustable force strut, adjusting the force of the strut based at least in part on the mass of the monitor; and orienting the stand for packaging. Once packaged, shipment may occur to a user with a monitor having the provided mass (e.g., consider a monitor configured for connection to a network or computing device, a monitor as part of a touch screen computing device, a tablet computing device, etc.). In another example, a monitor stand assembly may be provided with an adjustment mechanism adjustable by a user. With respect to mass, a monitor may have a mass on the order of about a kilogram to about 10 kilograms, or more (e.g., 1 kg to about 10 kg, or more).

FIG. 2 shows various orientations 210 for the monitor 130 and the stand assembly 150 of FIG. 1 along with an angle diagram 220, force diagram 250 for calculation of force for a strut and an example of an adjustment mechanism 270 to adjust force of a strut 280.

As shown in the various orientations 210, the stand assembly 150 includes a base 160, an arm 170 and a strut 180 while the monitor 130 includes a bottom edge 134, a mount 135, an intermediate edge 136 and a top edge 138. From left to right, the orientations include a vertical mode orientation with adjustable height ($\Delta z$), a tilt or free mode orientation with an adjustable tilt angle (see, e.g., $\beta_1$), and a touch mode orientation with a tilt angle $\beta_2$. In the vertical mode orientation, for a lower height position, the bottom edge 134 of the monitor 130 may contact a table top, for example, for added stability. In the tilt or free mode orientation, the monitor 130 is solely supported by the stand assembly 150 while, in the touch mode orientation, the monitor 130 may be supported at one or more contact points. For example, the intermediate edge 136 may contact a surface (e.g., desk top), a portion of the mount 135 (e.g., socket wall or walls) may contact a surface (e.g., desk top or base 160). Such one or more contact points can provide for added stability, especially during user touch (e.g., shake reduction, enhanced feel, etc.).

In the example of FIG. 2, the turret or cylindrical shaped base 160 includes a platform 161 positioned partially beneath and extending forward therefrom. The platform 161 includes a bottom surface 162, a front edge 163 (e.g., a beveled edge) and a top surface 164 while the base 160 includes an angled surface 166 upon which a joint component 168 extends outwardly therefrom and, for example, forms sockets for receipt of the arm 170 and the strut 180.

In the example of FIG. 2, the arm 170 includes a base joint 172 configured for pivotable attachment to the base 160, a monitor joint 178 configured for pivotable attachment to the monitor 130 (e.g., via the mount 135) and a strut socket 174 disposed between the base joint 172 and the monitor joint 178 for receipt of the strut 180.

In the example of FIG. 2, the strut 180 includes a base joint 182 for pivotable attachment to the base 160 and an arm joint 188 for pivotable attachment to the arm 170.

Referring to the angles 220, as shown, the base 160, the arm 170 and the strut 180 form legs of a triangle where two legs are fixed in length and the third leg is variable in length. Angles $\alpha_1$, $\alpha_2$ and $\alpha_3$ are shown, which vary depending on orientation (e.g., excepting tilt adjustments about the mount 135).

Referring to the force diagram 250, as shown, various lengths factor into the calculation of $F_1$, which is the force required of a strut. The equation in the force diagram further considers optional number of struts (n) and a reserve factor (R). Accordingly, as described herein, a monitor stand assembly may include more than one strut. As to mass of a monitor, or more generally a machine mounted to the stand assembly, the mass would normally be included in calculation of the force or weight parameter $F_G$ (e.g., F=ma) for the force equation shown in FIG. 2 (noting one or more other masses may be included such as mass of a mount, etc.).

As described herein, the strut 180 may be an adjustable force strut. For example, FIG. 2 also shows some details of an example of an adjustable force mechanism 270 for a strut 280. As shown, the strut 280 includes a strut housing 281, a strut rod 283 and a relief valve 285 as part of an adjustment mechanism for adjusting force exerted by the rod 283 with respect to the housing 281. In such an example, the strut 280 may be a gas strut.

Commercially available fluid struts (e.g., gas or liquid), also referred to at times as "fluid springs" or "fluid struts" may be suitable for use in the monitor stand assemblies described herein. Such struts may be locking via a mechanism that enables a rod to be locked at any point in its travel. For example, such a mechanism may be actuated by a plunger that protrudes from the rod where, when this plunger is depressed, the rod is free to operate as normal and, when the plunger is released, which may be at any point in the stroke, the rod is locked in that position. Locking fluid struts can offer, for example, flexible resistance to a rod being pushed or pulled, rigidity in tension (e.g., rigidity when a rod is being pulled and high resistance to the rod being pushed) or rigidity in compression (e.g., resistance to rod being pulled, rigid when rod is being pushed). A locking mechanism can operate when a plunger rod is depressed by opening a valve in a piston where, when the plunger rod is released the valve closes and the passage of liquid (e.g., oil, etc.) or gas is prevented, locking the piston in that position.

As described herein, a fluid strut can be optionally supplied with a relief valve, which allows the installer or operator to reduce force. Such a relief valve may also allow one to easily and economically recharge a gas or liquid strut should too much fluid be released.

In general, various types of connectors can be fitted (e.g., screwed, welded, etc.) to a strut. Common connectors include ball and socket joints, which can allow rotation about the mounting point, which helps to prevent side loading, and a flat welded blade with a through hole. Regarding the latter, such a connector can be configured to have a low profile and to be very cost-effective.

Where a strut is a gas strut, a so-called "shaft down" orientation is preferred, especially for storage. Where a strut is an oil strut, the orientation is less important as the oil may provide for sealing an interface between a rod and a piston oil reservoir. Referring to the orientations 210 of FIG. 2, the rightmost orientation with angle $\beta_2$ may be considered a storage configuration for a gas strut as it provides for a shaft down orientation (e.g., improved longevity of the gas strut).

Referring again to the angle diagram 220 of FIG. 2, as described herein, a portion of a base, at least a portion of an arm and a strut can, respectively, form three legs of a triangle, which pivot about three vertices. For example, a portion of the base can form a fixed length and a fixed angle leg of the triangle (e.g., fixed with respect to the base) and a strut can form a variable length leg of the triangle. Further, at least a portion of an arm can form a fixed length leg of the triangle.

In the examples of FIG. 2, the filled circles can represent vertices of a triangle, which may be axles or other pivot mechanisms. For example, a base can include a first axle configured for pivotable attachment of a base joint of an arm and a second axle for pivotable attachment of a base joint of a strut. As shown, in FIG. 2, the arm 170 can include an axle for pivotable attachment of an arm joint of a strut; noting that other attachment mechanisms may be used (e.g., ball joint, etc.).

As described herein, a monitor stand assembly may be disposed on a planar surface and be configurable in various orientations. For example, orientations may include a first orientation with an arm ascending from a base joint to a monitor joint and antiparallel to the planar surface, a second orientation with the arm parallel to the planar surface, and a third orientation with the arm descending from the base joint to the monitor joint and antiparallel to the planar surface.

Figure 3A:
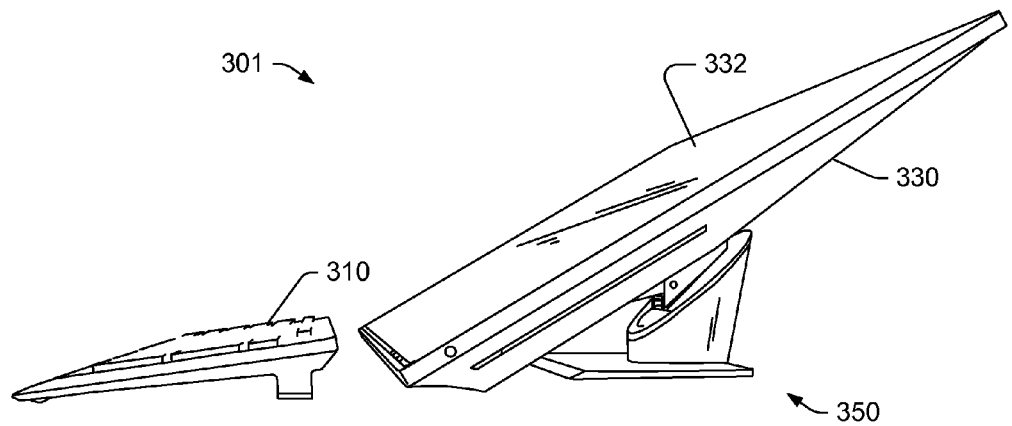
FIG. 3A is a diagram of an example of a system that includes a keyboard and FIG. 3B is a diagram of an example of a monitor that includes touch input capabilities.
Figure 3B:
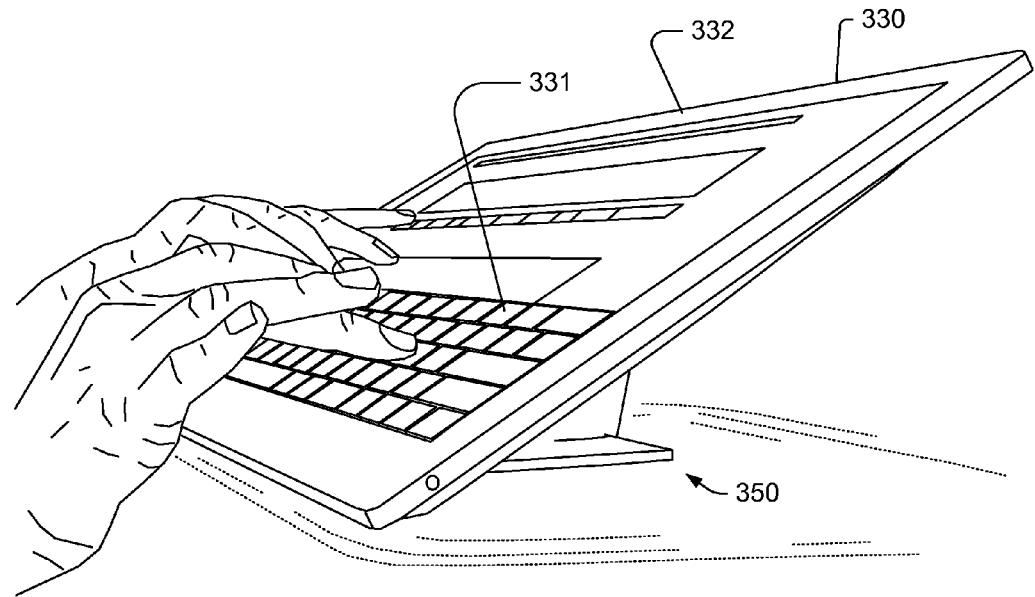

FIG. 3 shows an example of a system 301 that includes a keyboard 310 and an example of a monitor 330 that includes touch input capabilities. As shown in FIG. 3, the keyboard 310 can be disposed at an angle with respect to a work surface and a screen 332 of the monitor 330 disposed at another angle with respect to the work surface, achieved via the stand assembly 350. Where appropriately configured, the monitor 330 may include touch capabilities and optionally display a keyboard 331. The stand assembly 350 can provide a touch mode angle with respect to a work surface that readily allows for touching by a user's fingers or other implement (e.g., a pen, pointer, etc.).

FIG. 4 shows various views of an example of a monitor stand assembly 450 fitted to a monitor 430. As shown, the stand assembly 450 defines a z-axis and allows for rotation about the z-axis ($\Delta\Theta$). Further, an r-axis is shown with an origin at the z-axis.

In the example of FIG. 4, the monitor 430 includes a screen 432 (e.g., with dimensions $x_S$ and $y_S$), a bottom edge 434, an angled surface 433 (or edge), a mount 435, a planar surface 437, a top edge 438 and a media slot 439 (e.g., configured for receipt of a medium such as a disk, a card, etc.). In the example of FIG. 4, the stand assembly 450 includes a base 460 that includes a platform 461 with a bottom surface 462, a front edge 463 (e.g., a beveled edge or surface) and a top surface 464. As shown, the base 460 supports an arm 470 and a strut 480 where the arm 470 connects to the mount 435 to mount the stand assembly 450 to the monitor 430. As shown, the stand assembly 450 allows for height adjustment, tilt adjustment, and swivel adjustment of the monitor 430.

FIG. 5 shows the monitor stand assembly 450 of FIG. 4 fitted to the monitor 430 in a so-called touch mode orientation. In the example of FIG. 5, one or more contacts may exist. For example, the angled surface 433 of the monitor 430 may be in contact with a work surface (e.g., a desk top or table top), the mount 435 may be in contact with a surface of the platform 461 (e.g., front edge or upper surface), the planar surface 437 of the monitor 430 may be in contact with an upper surface 466 of the base 460, etc. As described herein, one or more contacts may provide for increased stability of a monitor mounted to a monitor stand assembly in a touch mode orientation.

As shown, the stand assembly 450 as fitted with the monitor 430 provides for a screen 432 angle of approximately 62 degrees ($\gamma_S$) with respect to a surface upon which the stand assembly 450 is seated. Further, the upper surface 466 of the base 460 may be disposed at an angle with respect to a surface upon which the stand assembly is seated ($\gamma_B$), which may be the same angle as the screen 432 of the monitor 430 or other angle (e.g., depending on angle of a back side surface of a monitor). As described herein, a swivel mechanism of a stand assembly may allow for rotation about an axis of the stand assembly. For example, the stand assembly 450 may provide for plus and minus rotation of the monitor 430 (e.g., approximately 45 degrees of rotation) about a z-axis defined by the stand assembly 450 (see, e.g., $\Delta\Theta$).

Also shown in the example of FIG. 5 are dimensions $L_M$, $L_B$ and $L_E$. In this example, $L_M$ is the projected length of the monitor 430 in a touch mode orientation while $L_B$ is a length of the base 460 (e.g., including at least the platform 461) and $L_E$ is a length of the surface 433 of the monitor 430. The length $L_M$ is greater than and spans the lengths $L_B$ and $L_E$. Further, as shown, a gap may exist between $L_B$ and $L_E$. For the example shown, $L_B$ is selected and located such that no contact exists between the surface 433 and the platform 461 of the base 460 (e.g., as the components are aligned in the touch mode orientation). Such an arrangement allows the surface 433 to contact a table top, desk top, etc., and provide for stability in addition to contact between the platform 461 and the table top, desk top, etc.

As described herein, an edge or a surface of a monitor may be made of a resilient material such as a rubber or polymer that can absorb some vibration and provide for a coefficient of friction to that acts to stabilize the monitor. For example, the surface 433 of the monitor 430 may be made of such a material. Such a material can also cushion the monitor 430 when being moved to a touch mode orientation. Further, referring to the example of FIG. 2, one or more of the edges of the monitor 130 may include such a material (e.g., consider the edge 134 for supporting the monitor 130 in the vertical mode orientation).

Figure 6A:
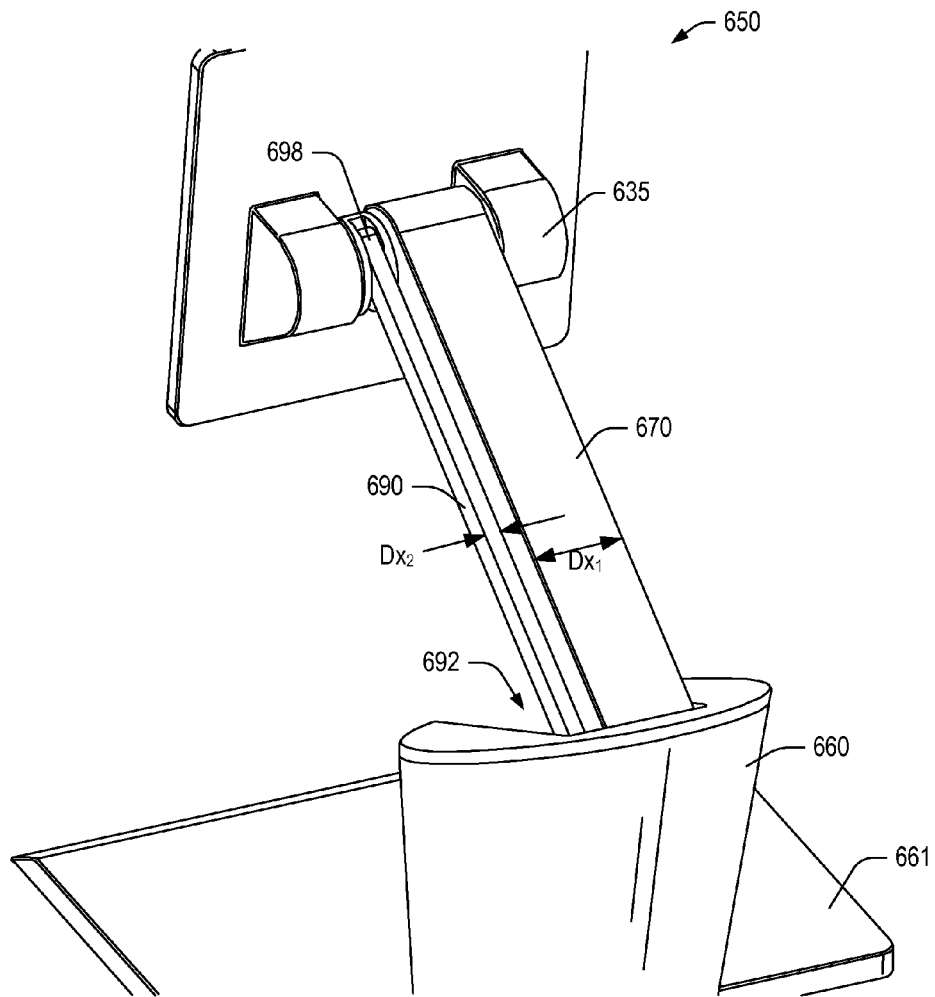
FIG. 6A is a perspective view of an example of a monitor stand assembly and FIG. 6B is a diagram of an example of a method.
Figure 6B:
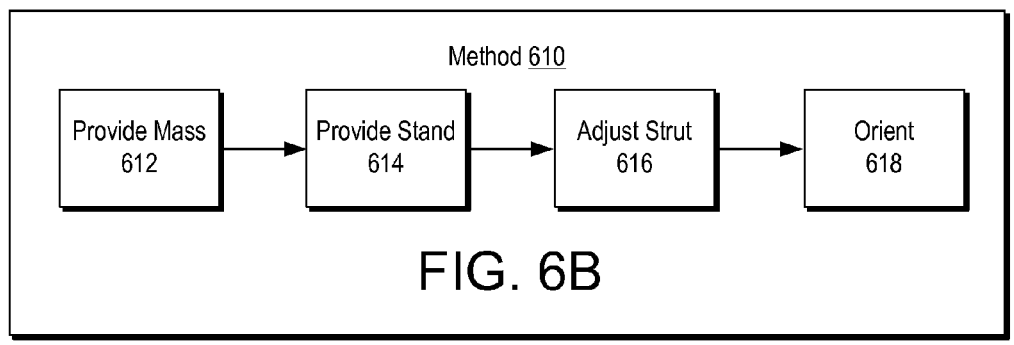

FIG. 6 shows an example of a monitor stand assembly 650 that includes a type of a four-bar linkage assembly and an example of a method 610. Such an arrangement of components may provide for additional support and, for example, joint friction to achieve suitable feel as a monitor mounted to a stand assembly is moved from one orientation to another orientation.

The assembly 650 includes base 660 and arms 670 and 690 as well as a mount 635, which may be fitted to a monitor. As shown, the base 660 includes a platform 661 that extends outwardly from the base 660. The perspective view of FIG. 6 does not show a strut, which is mounted to the base 660 and the arm 670.

The arms 670 and 690 may be referred to as bars where, for example, the bar 670 is wider ($\Delta x_y$) than the bar 690 ($\Delta x_2$). In the example of FIG. 6, the bar 670 includes an underside fitting for mounting a strut (not shown) and the bar 690 includes a base joint 692 (not shown) and a monitor joint 698. Accordingly, the assembly 650 of FIG. 6 may function akin to the force diagram 250 of FIG. 2 (e.g., with an additional arm).

In the example of FIG. 6, the method 610 may be suitable for the use with the stand assemblies 150, 350, 450, 650 or optionally other types of monitor stand assemblies with an adjustable force strut. The method 610 includes a provision block 612 for providing a mass for a touch screen device, a provision block 614 for providing a stand that includes an adjustable force strut, an adjustment block 616 for adjusting the force of the strut based at least in part on the mass of the touch screen device; and an orientation block 618 for orienting the stand for packaging. In such a method, the providing a mass for a touch screen device can provide a mass for a touch screen computing device, a mass for a tablet computing device, etc. As mentioned, orientation for packaging may include orienting a gas strut "shaft down" to provide for lubrication of an interface between a rod (i.e., shaft) and a piston chamber (e.g., to reduce gas leakage during storage, shipping, etc.). As to shipping, a box may be labeled appropriately to require that the orientation of the box comports with the "shaft down" orientation of the rod.

FIG. 7 shows the monitor stand assembly of FIG. 6 along with a block diagram of an example of a machine 710, optionally mounted to the monitor stand assembly 650 or in communication with a monitor mounted to the monitor stand assembly. The perspective view of FIG. 7 does not show the strut, which is mounted to the base 660 and the arm 670.

In FIG. 7, additional details are shown of the monitor stand assembly 650 of FIG. 6. For example, a cover of the base 660 is removed to reveal the base joint 672 of the arm 670 and the base joint 692 of the arm 690 with respect to an axle 652. Further, covers of the mount 635 are removed to reveal various components that provide for pivotable attachment of the arms 670 and 690 with respect to an axle 658. As shown, the axles 652 and 658 may include threads for accepting nuts, which may be tightened to secure the axles 652 and 658 and optionally provide for suitable tension (e.g., friction) as to rotation of the arms 670 and 690 about one or both of the axles 652 and 658. Also shown in FIG. 7 are details of the mount 635, which may include a planar piece with apertures to receive mounting components for mounting the machine 710 and may include L-shaped pieces mounted to the planar piece where the L-shaped pieces each include an aperture to receive the axle 658. Alternatively, a U-shaped piece or component or components may be used. As to the axle 652, the base 660 can include a bracket for mounting the axle 652 while also including features for mounting a strut.

In the example of FIG. 7, the platform 661 is shown as including an opening 667 to accommodate one or more cables 622 and 624. Such cables may provide for power, information, etc. For example, the cable 622 may be a power cable to power the machine 710 and the cable 624 may be a communication cable (e.g., HDMI or other) to provide information for rendering to a screen of the machine 710 (e.g., and optionally audio for speakers or a speaker jack of the machine 710). Such cables may be positioned along an underside of the arm 670 to emerge adjacent to corresponding inputs or interfaces of the machine 710.

As described herein, a machine 710 can include various circuitry such as one or more processors 712, memory 714 and one or more interfaces 716. In general, a machine or monitor may be considered an information handling device (e.g., for at least display of information). Such a device may be configured for one or more purposes selected from a variety of purposes (e.g., media, gaming, drafting, computing, etc.). In the example of FIG. 7, an interface may include a power interface, optionally for charging a battery of the machine 710. As described herein, a screen may be considered a visual interface, optionally with touch capabilities to receive input via touch, whether by a user finger or other implement. Further, as described herein, touch can include multi-touch and optionally gestures.

As described herein, a monitor stand assembly can support a machine in one or more modes, for example, a free-standing mode and a touch mode. In a free-standing mode, the machine may be solely supported by the stand assembly while in a touch mode, the machine may be optionally supported by one or more contact points with a surface, which may be a work surface, a surface of the stand assembly, or both a work surface and a surface of the stand assembly.

As described herein, a monitor stand assembly can include a base, an arm that includes a monitor joint configured for pivotable attachment to a monitor and a base joint configured for pivotable attachment to the base, and an adjustable force strut. Such a strut may include a strut housing, a strut rod, an adjustment mechanism for adjusting force exerted by the rod with respect to the housing, an arm joint configured for pivotable attachment to the arm and a base joint configured for pivotable attachment to the base.

A monitor stand assembly may include a monitor pivotably attached to a monitor joint of an arm where, for example, the monitor is optionally a computing device. For example, as described herein, a system can include a stand configured to contact a planar surface where the stand includes a base, an arm and a strut; a computing device configured for mounting to the arm of the stand where the computing device includes a planar touch screen; and orientations. In such an example, the orientations can include: a touch mode where the arm and a support contact, formed at least in part by a portion of the system, support the computing device; a vertical mode where the arm and a support contact, formed at least in part by a portion of the computing device, support the computing device; and a free mode where the arm supports the computing device.

With respect to a support contact, consider, for example, one or more of the edges of the monitors 130, 330 or 430 and one or more surfaces of the base 150, 350, or 450. More particularly, consider the orientations 210 of FIG. 2 where the edge 134 of the monitor 130 can be a support contact, where the mount 135 can be a support contact, where the edge 136 of the monitor 130 can be a support contact and where the edge 163 of the platform 161 can be a support contact (e.g., to support the monitor 130 via contact with the mount 135). Further, as described herein, the surface 164 of the platform 161 may be a support contact (e.g., to support the monitor 130 via contact with the mount 135). As described herein, a computing device or, more generally, a display machine, can include a rubberized surface configured to form at least one support contact.

As described herein, for a touch mode orientation, a mount configured for mounting the arm to the computing device can optionally form a support contact with another surface (e.g., a surface of the stand assembly). As described herein, for a vertical mode orientation, an edge of a computing device can optionally form a support contact with a planar surface.

As described herein, a system can include a stand assembly with an adjustable force strut, for example, where the strut has a force adjustably selected based on mass of a computing device mounted to the stand assembly.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 8:
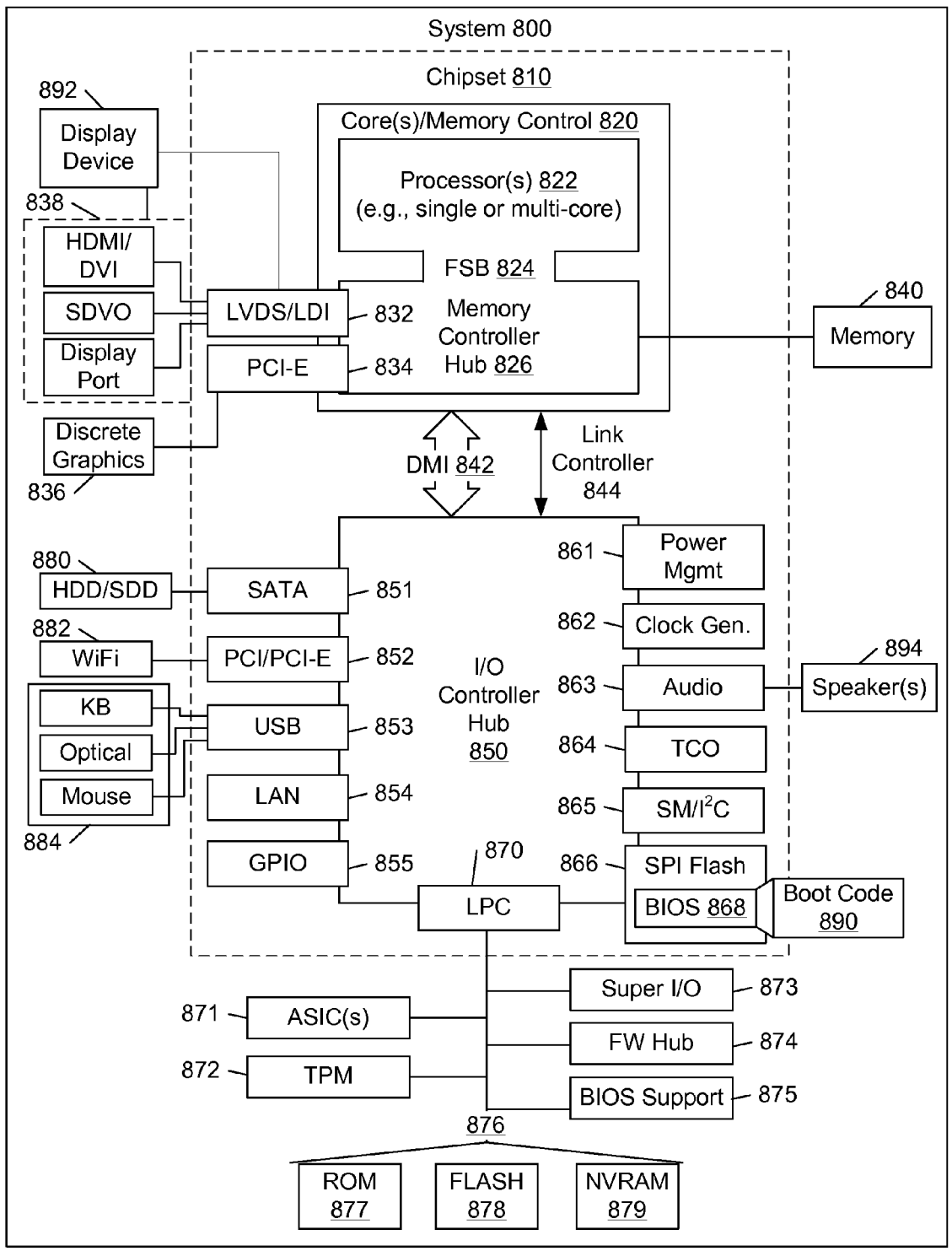
FIG. 8 is a diagram of an example of a machine.

While various examples of circuits or circuitry have been discussed, FIG. 8 depicts a block diagram of an illustrative computer system 800. The system 800 may be a computer system sold by Lenovo (US) Inc. of Morrisville, N.C. (e.g., a ThinkStation® system); however, as apparent from the description herein, a satellite, a base, a server or other machine may include other features or only some of the features of the system 800. As described herein, a monitor or machine such as one of the devices 130, 330, 430, and 710 may include at least some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:
1. A system comprising:
  a stand that comprises a platform, a base connected to the platform, an arm connected to a socket of the base, and a strut connected to a socket of the arm and a socket of the base wherein the platform comprises a horizontal bottom surface supportable on a planar surface, an upper surface, a back edge and a front edge;
  a computing device mounted to the arm of the stand wherein the computing device comprises a planar touch screen on a touch screen side, a bottom edge, a top edge, and an angled contact surface disposed between the top edge and the bottom edge on a side opposite the touch screen side; and orientations wherein the orientations comprise
- a touch mode orientation wherein the arm and the angled contact surface support the computing device wherein the angled contact surface is disposed in front of the front edge of the platform and below the upper surface of the platform and wherein the top edge of the computing device is disposed in back of the back edge of the platform,
- a vertical mode orientation wherein the arm and the bottom edge of the computing device support the computing device wherein the top edge and the bottom edge of the computing device are disposed in front of the front edge of the platform and wherein the bottom edge of the computing device is disposed below the upper surface of the platform, and
- a free mode orientation wherein the arm pivotably supports the computing device over a range of angles about a vertical angle.

2. The system of claim 1 wherein the angled contact surface is rubberized and disposed at an acute angle with respect to the planar touch screen.

3. The system of claim 1 wherein the strut comprises an adjustable force strut.

4. The system of claim 3 wherein the strut comprises a force adjustably selected based on mass of the computing device.

5. The system of claim 1 wherein, for the touch mode orientation, an arm mount of the computing device contacts the upper surface of the platform.

6. The system of claim 3 wherein the strut comprises an adjustable force gas strut that comprises an adjustment mechanism for adjusting force exerted by a rod of the gas strut with respect to a housing of the strut.

7. The assembly of claim 6 wherein the adjustment mechanism comprises a relief valve that relieves gas pressure in the housing.

\* \* \* \* \*